United States Patent
McLaughlin et al.

(10) Patent No.: US 11,127,550 B2
(45) Date of Patent: Sep. 21, 2021

(54) CONTACT ARRANGEMENT FOR PRE-INSERTION RESISTOR

(71) Applicant: General Electric Technology GmbH, Baden (CH)

(72) Inventors: Keith McLaughlin, Charleroi, PA (US); Ludovic Darles, Villeurbanne (FR); Jérôme Laurent, Villeurbanne (FR); Thomas Tometich, Charleroi, PA (US); Andrew Chovanec, Charleroi, PA (US); Chase Peltier, Charleroi, PA (US)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 16/893,031

(22) Filed: Jun. 4, 2020

(65) Prior Publication Data

US 2020/0388454 A1    Dec. 10, 2020

(30) Foreign Application Priority Data

Jun. 4, 2019   (EP) ..................................... 19178265

(51) Int. Cl.
*H01H 33/16* (2006.01)
*H01H 33/12* (2006.01)
(Continued)

(52) U.S. Cl.
CPC .......... *H01H 33/166* (2013.01); *H01H 33/12* (2013.01); *H01H 33/161* (2013.01);
(Continued)

(58) Field of Classification Search
CPC .... H01H 33/166; H01H 33/12; H01H 33/161; H01H 33/164; H01H 33/165;
(Continued)

(56) References Cited

U.S. PATENT DOCUMENTS 4,324,959 A * 4/1982 Hall ..................... H01H 33/166
                                                        218/143
5,245,145 A * 9/1993 Freeman .............. H01H 33/166
                                                        218/143
(Continued)

FOREIGN PATENT DOCUMENTS

FR    2 553 926 A1    4/1985
FR    3 016 470 A1    7/2015

OTHER PUBLICATIONS

Search Report issued in European Application No. 19 17 8265, dated Oct. 14, 2019, 1 page.

*Primary Examiner* — William A Bolton
(74) *Attorney, Agent, or Firm* — Eversheds Sutherland (US) LLP

(57) ABSTRACT

A contact arrangement for a Pre-Insertion Resistor (PIR) wherein a control rod is arranged to move a movable contact, against the force of a biasing member, into temporary connection with a PIR. The control rod comprises a tulip with a plurality of resilient fingers and having a first diameter where it is able to mechanically couple to a latching ring on the movable contact, and a second diameter where the tulip is deformed with the fingers deflected inwards, once the resistance to movement exceeds a predetermined value, wherein the latching ring is able to pass over the tulip to decouple the movable contact from the control rod. The contact arrangement is particularly suited for a PIR arranged for connection in parallel to the interrupter of a gas-insulated switchgear (GIS) circuit breaker.

15 Claims, 2 Drawing Sheets

(51) Int. Cl.
    *H01H 33/40* (2006.01)
    *H01H 33/42* (2006.01)
    *H02B 5/06* (2006.01)

(52) U.S. Cl.
    CPC ............ *H01H 33/40* (2013.01); *H01H 33/42* (2013.01); *H02B 5/06* (2013.01); *H01H 2033/426* (2013.01)

(58) Field of Classification Search
    CPC .... H01H 33/167; H01H 33/168; H01H 33/02; H01H 33/40; H01H 33/42
    USPC ................................................. 218/143, 140
    See application file for complete search history.

(56) References Cited

U.S. PATENT DOCUMENTS

| | | | | | |
|---|---|---|---|---|---|
| 5,717,184 | A | * | 2/1998 | Girodet | H01H 33/166 218/1 |
| 5,814,782 | A | * | 9/1998 | Muller | H01H 33/166 218/143 |
| 5,841,614 | A | * | 11/1998 | Perret | H01H 33/166 361/14 |
| 7,078,643 | B2 | * | 7/2006 | Rostron | H01H 33/166 218/144 |
| 8,426,760 | B2 | * | 4/2013 | Holaus | H01H 33/16 218/143 |
| 2013/0119022 | A1 | | 5/2013 | Cimala | |

* cited by examiner

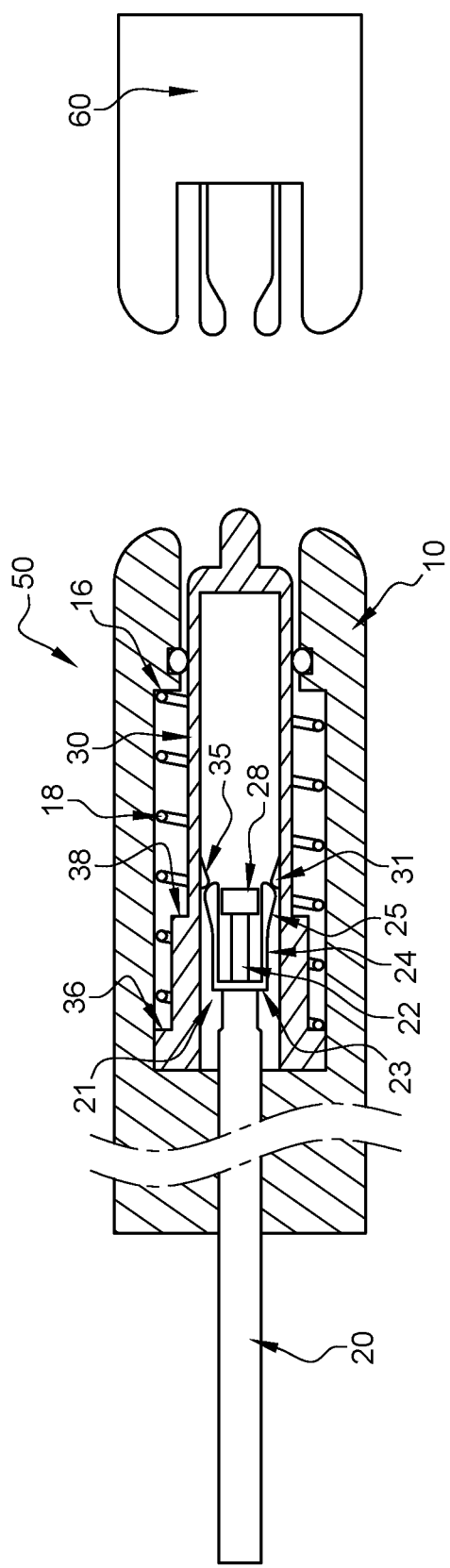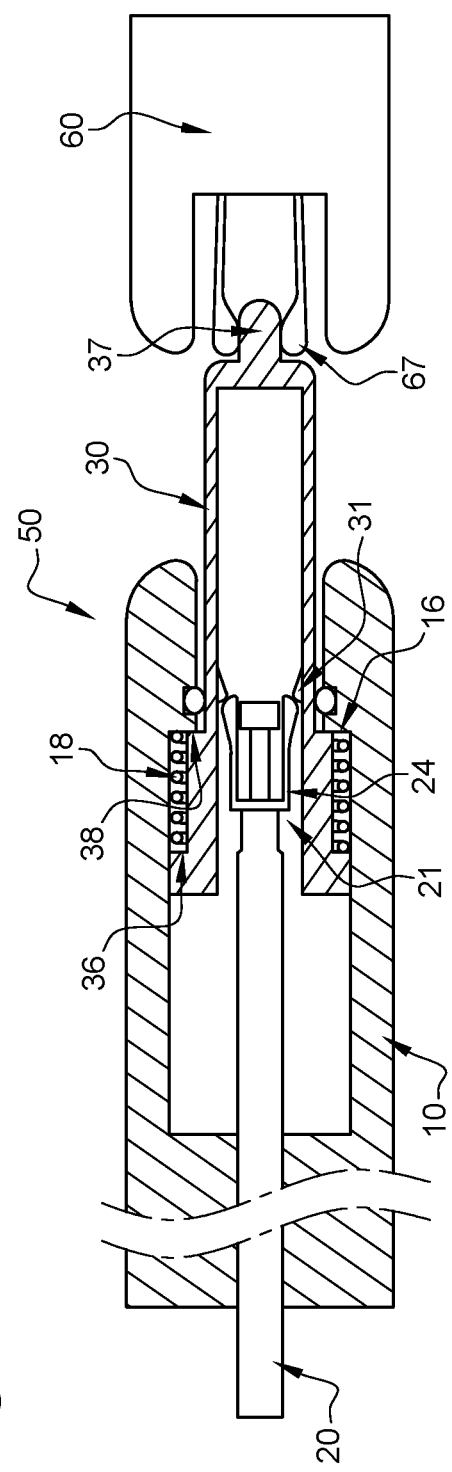

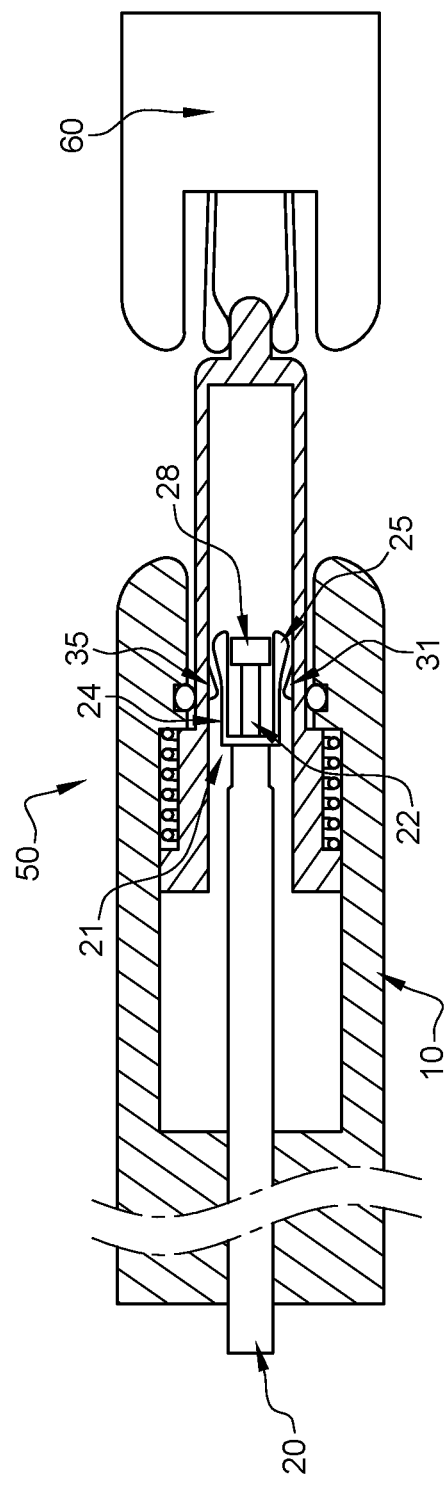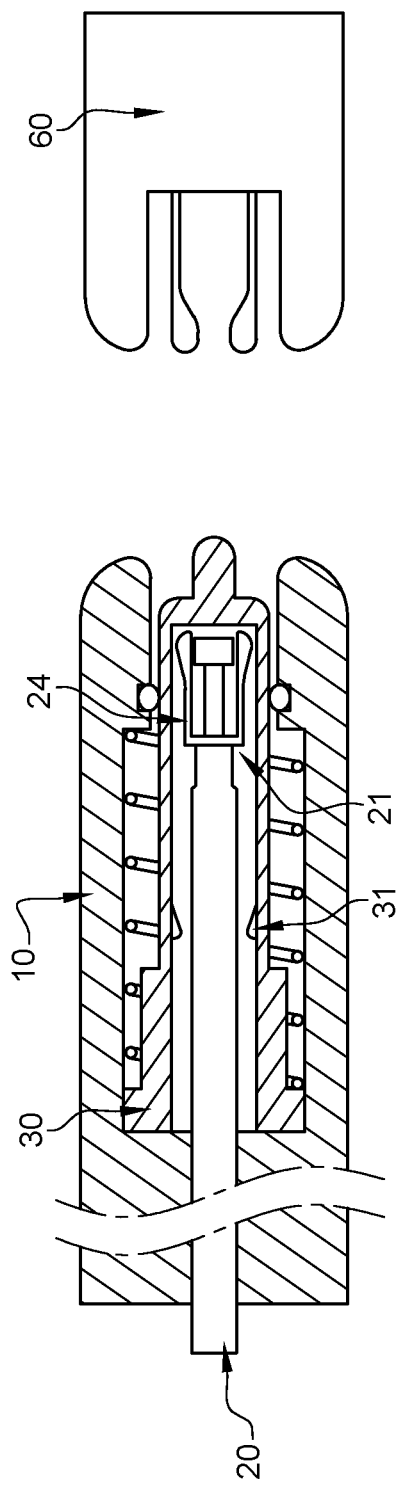

CONTACT ARRANGEMENT FOR PRE-INSERTION RESISTOR

RELATED APPLICATION

This application claims priority to European Application No. 19178265.5, filed Jun. 4, 2019, the contents of which are incorporated by reference.

TECHNICAL FIELD

The invention relates to the field of circuit breakers for switchgears. More particularly, the invention relates to the contact arrangement for a Pre-Insertion Resistor arranged in parallel to the interrupter of the circuit breaker. The invention also relates to a method of temporarily connecting with a Pre-Insertion Resistor.

PRIOR ART

Circuit breakers for high-voltage Gas-Insulated Switchgear (GIS) use Pre-Insertion Resistors (PIRs) in order to limit switching surge phenomena, i.e. the short duration transient voltages and currents generated when the interrupter is closed. For interrupters which use double-motion, the dynamics complicates the implementation of a series-connected PIR, and so parallel-connected PIRs, i.e. PIRs arranged to be connected and disconnected in parallel to said interrupter, are preferred. The contact arrangements for such PIRs are arranged to connect to the PIR to establish current flow therethrough just prior to the interrupter closing, and then disconnect from the PIR just after. The temporary connection to the PIR must be long enough to damp out the abovementioned transients, but short enough so as not to overheat the PIRs. It typically lasts 8 to 20 ms.

US-2013/119022-A1 discloses a switchgear circuit breaker having a contact arrangement in which a control rod can mechanically couple to a movable contact to push it, against the bias of a return spring, until it connects to a PIR. The mechanical coupling is achieved by a toroidal spring which resides in a groove provided on the control rod, and projects outwards to engage a groove in the movable contact. When the resistance to the movement experienced by the movable contact exceeds a certain value, the toroidal spring deforms, disengaging from the groove in the movable contact, thus mechanically decoupling it from the control rod. The movable contact then returns under the bias of the return spring to its original position. In this way, a parallel-connected PIR can be connected and disconnected.

Unfortunately, the mechanical coupling of this contact arrangement is prone to failure. Due to the large forces and high speeds involved, the toroidal spring usually ends up being damaged. This results in the movable contact not connecting to and disconnecting from the PIR in a reliable manner. In certain cases, the movable contact may remain connected to the PIR, which can have serious consequences. The contact arrangement is therefore unable to last when put through an extended number of cycles. Yet other contact arrangements have been proposed, but they have not been satisfactory either.

As such, there is clearly a need for a circuit breaker having a contact arrangement for a PIR which is more reliable and possesses the necessary mechanical endurance.

BRIEF DESCRIPTION OF THE INVENTION

The present invention relates to a contact arrangement for a Pre-Insertion Resistor (PIR) comprising a control rod and a movable contact arranged to be moved along an axis, against the force of a biasing member, into temporary connection with a PIR, wherein the control rod is able to move the movable contact when mechanically coupled to it, and wherein the movable contact is arranged to decouple from the control rod, and return under the force of the biasing member, once the resistance to movement exceeds a predetermined value, the control rod comprising a tulip with a plurality of resilient fingers, and the movable contact comprising a latching ring, the tulip having a first diameter where it is able to engage the latching ring to mechanically couple the control rod to the movable contact, the fingers arranged to be deflected inwards such that the tulip is deformed to a second diameter, wherein the latching ring is able to pass over the tulip to decouple the movable contact from the control rod.

The invention also relates to a method of temporarily connecting a movable contact with a Pre-Insertion Resistor (PIR) comprising providing a control rod comprising a tulip with a plurality of resilient fingers, providing a movable contact comprising a latching ring, engaging the latching ring with the tulip at a first diameter to mechanically couple the control rod to the movable contact, moving the movable contact along an axis, against a biasing force, into temporary connection with a PIR, and when the resistance to movement exceeds a predetermined value, deforming the tulip from the first diameter to a second diameter by deflecting its fingers inwards and passing the latching ring over the tulip to decouple movable contact from the control rod, and returning the movable contact under the biasing force.

Preferable features of the invention are defined in the appendant claims.

BRIEF DESCRIPTION OF THE FIGURES

The invention will be better understood when reading the following detailed description and non-limiting examples, as well as studying the figures, wherein:

FIG. 1 shows a cross-section view of a contact arrangement according to a preferred embodiment of the invention, with the movable contact in a start position and mechanically coupled to the control rod, FIG. 2 shows the same contact arrangement, but with the movable contact an end position and connected to the PIR, FIG. 3 shows the same contact arrangement, with the movable contact connected to the PIR but decoupled from the control rod, and FIG. 4 shows the same contact arrangement, but with the movable contact returned to the start position and disconnected from the PIR.

In all of these figures, identical references can designate identical or similar elements. In addition, the various portions shown in the figures are not necessarily shown according to a uniform scale, in order to make the figures more legible.

DETAILED DESCRIPTION OF PARTICULAR EMBODIMENTS

FIGS. 1-4 show a contact arrangement 50 for a Pre-Insertion Resistor (PIR) according to a preferred embodiment of the invention. They show in particular details of the mechanical coupling between the control rod 20 and the movable contact 30 at consecutive stages of temporary connection with a PIR 60.

In the preferred embodiment, the contact arrangement 50 is provided in a circuit breaker installed in a Gas-Insulated Switchgear (GIS), the GIS circuit breaker comprising a double-motion interrupter and a parallel-connected PIR 60, i.e. a PIR arranged to be connected and disconnected in parallel to said interrupter. It comprises a control rod 20 operated by an actuator, and a movable contact 30 arranged to be moved by the control rod 20 into temporary electrical connection with a PIR 60 just before the interrupter is closed and disconnected from the PIR 60 just after.

The movable contact 30 is slidably located in a tubular housing 10, and movable along an axis in a range between a start position and an end position. The movable contact 30 is tubular and comprises an external shoulder 36. Meanwhile, the housing 10 has an internal shoulder 16. A helical spring 18 is located between the internal shoulder 16 and the external shoulder 36, such that the movement of the movable contact 30 towards the end position will compress the spring 18. The movable contact 30 also comprises an external step 38, arranged to abut against the internal shoulder 16 of the housing at the end position.

The control rod 20 is located in the housing 10 and partly within the movable contact 30. It can move along the axis in a range allowing it to push the movable contact 30 between the start position and end position. The control rod 20 and the movable contact 30 are arranged such that they can be mechanically coupled to and decoupled from each other. However, in the contact arrangement 50 of the invention, the control rod 20 has a tulip 21, while the movable contact 30 has a latching ring 31. The tulip 21 and the latching ring 31 are the components that engage and disengage, to mechanically couple and decouple the control rod 20 and the movable contact 30.

More specifically, the tulip 21 is provided at the distal end of the control rod 20, aligned with the axis, and comprises a hub 22, a flange 23 located on the hub 22 and extending radially to the axis, and a plurality of fingers 24. The fingers 24 extend towards the PIR 60 and are attached at their base to the periphery of the flange 23 such that they are substantially parallel to, and surround, the axis. The tip of each finger 24 has a wedge-shaped formation 25, as seen in FIG. 1, projecting radially outwards (away from the axis). These fingers 24 are resilient, and able to deflect inwards towards the axis. The flange 23 may also be made resilient to facilitate their deflection. When the fingers 24 are undeflected, the tulip 21 has a first diameter (outer), and when the fingers 24 are deflected towards the axis, the tulip 21 has a second diameter. The tulip 21 therefore can be deformed from a first diameter to a second diameter smaller than the first.

The latching ring 31 on the other hand is provided on the movable contact 30, near or at the proximal end. It is located such that it also surrounds the axis and is aligned with the tulip 21. The latching ring 31 has a wedge-shaped formation 35 projecting radially inwards (towards the axis). As it is generally rigid and not intended to deform, a single annular wedge-shaped formation 35 is sufficient, although it will be understood that the wedge-shape formation 35 may in cases be made up of several arc sections. The diameter (internal) of the latching ring 31 is such that it is smaller than the first diameter of the tulip 21, but larger than the second diameter.

When the movable contact 30 is to be brought into connection with the PIR 60, the control rod 20 is first moved towards the movable contact 30. The fingers 24 on the tulip 21 of the control rod 20 engage the latching ring 31 on the movable contact 30. The tulip 21 is at the first (larger) diameter at this point, and so the wedge-shape formations 25 on the fingers 24 abut the complementary wedge-shape formation 35 on the latching ring 31. This engagement is such that the control rod 20 is mechanically coupled to the movable contact 30, and able to move it in the axial direction towards the PIR 60.

The control rod 20 then begins to push the movable contact 30 in the direction of the PIR 60. At first, there is little resistance to the movement. As the pushing progresses, the resistance to the movement increases due to the helical spring 18 being compressed. The fingers 24 begin deflecting, although only minimally, maintaining the engagement with the latching ring 31, and thus the mechanical coupling between the control rod 20 and the movable contact 30. This continues until the end position, shown in FIG. 2, where the external step 38 of the movable contact 30 is in abutment engagement with the internal shoulder 16 of the housing 10 and thus the movable contact 30 prevented from moving further towards the PIR 60. At the end position, the helical spring 18 is completely compressed, and a pin 37 provided at the distal end of the movable contact 30 is in complete connection with a terminal 67 on the PIR 60.

Referring now to FIG. 3, with continued pushing of the control rod 20, the resistance to the axial movement exceeds a predetermined value, which is the engagement force between the tulip 21 and the latching ring 31, or more precisely, the axial component of the frictional force between the wedge-shaped formations 25 on the tulip 21 and the wedge-shaped formation 35 on the latching ring 31. This causes the fingers 24 of the tulip 21 to deflect inwards, urged by the latching ring 31, deforming the tulip 21 to the second (smaller) diameter, resulting in the wedge-shape formation 35 of the latching ring 31 sliding over the wedge-shape formations 25 of the tulip 21. To prevent over-deflection of the fingers 24 of the tulip 21, an elastomeric ring 28 may be secured with a fastener to the hub 22, between the tips of the fingers 24 and the axis. This helps to ensure that the fingers 24 of the tulip 21 are not damaged or permanently deformed when the latching ring 31 passes over.

The latching ring 31 is thereby disengaged from the tulip 21, mechanically decoupling thus the movable contact 30 from the control rod 20. Under the force of the helical spring 18, the movable contact 30 disconnects from the PIR 60 and returns back towards its start position, as can be seen in FIG. 4, the latching ring 31 passing over the entire deformed tulip 21. The temporary connection with the PIR 60 typically lasts 8 to 20 ms. As soon as the latching ring 31 passes over the tulip 21, the resilient fingers 24 of the tulip 24 revert to their undeflected state, restoring the tulip 21 to its first diameter. The control rod 20 however remains stationary, located now deeper within the returned movable contact 30.

The double-motion interrupter of the GIS circuit breaker is now closed, and the PIR 60 safely disconnected from the electrical connection in parallel to the interrupter. To reset the contact arrangement 50, the actuator merely retracts the control rod 20 until the tulip 21 passes back through the latching ring 31, wherein it is returned to a position where it can recouple to the movable contact 30 (as shown in FIG. 1).

The complementary wedge-shaped formations 25, 35 on the latching ring 31 and tulip 21 are shaped such that it is easier to pull the tulip 21 back through the latching ring 31 compared to pushing it through. Typically, the angle on the sides of the wedge-shaped formations 25, 35 that engage during mechanical coupling is more inclined, making it more difficult for the wedge-shaped formations 25, 35 to slide over one another, while the angle on the reverse sides is less inclined, allowing them to slide over one another more easily. It will be appreciated that the range of the control rod 20 is ideally slightly larger than that of the movable contact 30, so as to be able to push the movable contact 30 within its range.

The tulip 21 and latching ring 31 are preferably made of stainless steel, although other materials can be envisaged. Meanwhile, the elastomeric ring 28 is preferably made of EPDM rubber, although other materials can also be envisaged.

The contact arrangement 50 for PIR of the present invention represents a significant improvement over known contact arrangements, the tulip 21 and latching ring 31 being far better suited to mechanically coupling and decoupling the control rod 20 and the movable contact 30. In particular, the fingers 24 of the tulip 21 experience minimal angular deflection, owing to their length being much greater than what the tip of the finger 24 is displaced during deflection. This in turn implies that the stress experienced at the connection between the fingers 24 and the flange 23, or the hub 22, is also minimal. Furthermore, the wedge-shaped formations 25, 35 are particularly advantageous for engagement and disengagement between the tulip 21 and the latching ring 31. Consequently, the mechanical coupling is better adapted to withstand deformation. This contact arrangement 50 therefore possesses the necessary mechanical endurance and reliability to last an extended number of cycles, allowing thus a superior circuit breaker to be attained.

While the contact arrangement and associated method of the invention have been disclosed in relation to a circuit breaker with double-motion interrupter in a GIS, it will be understood that the invention is not to be thus limited. For example, it may also be used in an air-insulated switchgear (AIS), or with single motion interrupters. Further, while the end position was described as the point where the movable contact abuts the housing, it may instead be determined solely by the compression of the helical spring, in which case the external step on the movable contact can be omitted. Although complementary wedge-shaped formations provide the optimal engagement of the tulip and latching ring, formations of other shapes may be envisaged.

The invention claimed is:

1. A contact arrangement for a pre-insertion resistor (PIR) comprising a control rod and a movable contact arranged to be moved along an axis, against a force of a biasing member, into temporary connection with the PIR, wherein the control rod is able to move the movable contact when mechanically coupled to the movable contact, and wherein the movable contact is arranged to decouple from the control rod, and return under the force of the biasing member, once a resistance to movement exceeds a predetermined value, wherein the control rod comprises a tulip with a plurality of resilient fingers, and the movable contact comprises a latching ring, the tulip having a first diameter operable to engage the latching ring to mechanically couple the control rod to the movable contact, the plurality of resilient fingers arranged to be deflected inwards such that the tulip is deformed to a second diameter, wherein the latching ring is able to pass over the tulip to decouple the movable contact from the control rod.

2. The contact arrangement according to claim 1, wherein the tulip further comprises a hub and a flange located on the hub, the plurality of resilient fingers attached on a periphery of the flange and extending parallel to, and surrounding, the axis, and arranged to be deflected towards the axis.

3. The contact arrangement according to claim 2, wherein the tulip further comprises an elastomeric ring secured to the hub, located between tips of the plurality of resilient fingers and the axis.

4. The contact arrangement according to claim 2, wherein the tulip comprises outwardly-projecting wedge-shaped formations at tips of the plurality of resilient fingers, the outwardly-projecting wedge-shaped formations arranged to engage the latching ring.

5. The contact arrangement according to claim 4, wherein the latching ring has an inwardly-projecting wedge-shaped formation arranged for engagement by the outwardly-projecting wedge-shaped formations of the plurality of resilient fingers.

6. The contact arrangement according to claim 1, wherein the movable contact has an external shoulder, and is arranged to move in a housing with an internal shoulder, the biasing member being provided between the external shoulder and the internal shoulder.

7. The contact arrangement according to claim 6, wherein the movable contact further comprises an external step.

8. The contact arrangement according to claim 6, wherein a predetermined amount to a resistance to movement being exceeded is determined by a compression of the biasing member, or by when the external step of the movable contact abuts the internal shoulder of the housing.

9. The contact arrangement according to claim 1, wherein the biasing member is a helical spring.

10. The contact arrangement according claim 1, wherein the tulip and latching ring are made primarily of stainless steel.

11. A circuit breaker having an interrupter and a parallel-connected PIR, the circuit breaker further comprising the contact arrangement according to claim 1 for connecting to the PIR.

12. The circuit breaker according to claim 11, wherein the interrupter is a double-motion interrupter.

13. A method of temporarily connecting a movable contact with a pre-insertion resistor (PIR), the method comprising providing a control rod comprising a tulip with a plurality of resilient fingers, providing a movable contact comprising a latching ring, engaging the latching ring with the tulip at a first diameter to mechanically couple the control rod to the movable contact, moving the movable contact along an axis, against a biasing force, into temporary connection with the PIR, and when a resistance to movement exceeds a predetermined value, deforming the tulip from the first diameter to a second diameter by deflecting one or more of the plurality of resilient fingers inwards and passing the latching ring over the tulip to decouple movable contact from the control rod, and returning the movable contact under the biasing force.

14. The method according to claim 13, comprising engaging an inwardly-projecting wedge-shaped formation on the latching ring with outwardly-projecting wedge-shaped formations at tips of the plurality of resilient fingers.

15. The method according to claim 13, comprising determining the predetermined value to the resistance to movement by compression of a biasing member or by abutting of the movable contact against a housing of the movable contact.

* * * * *